Feb. 23, 1932.    A. W. LARSON    1,846,213
ANTIREACTION HARNESS FOR DOMESTIC ANIMALS
Filed May 21, 1928
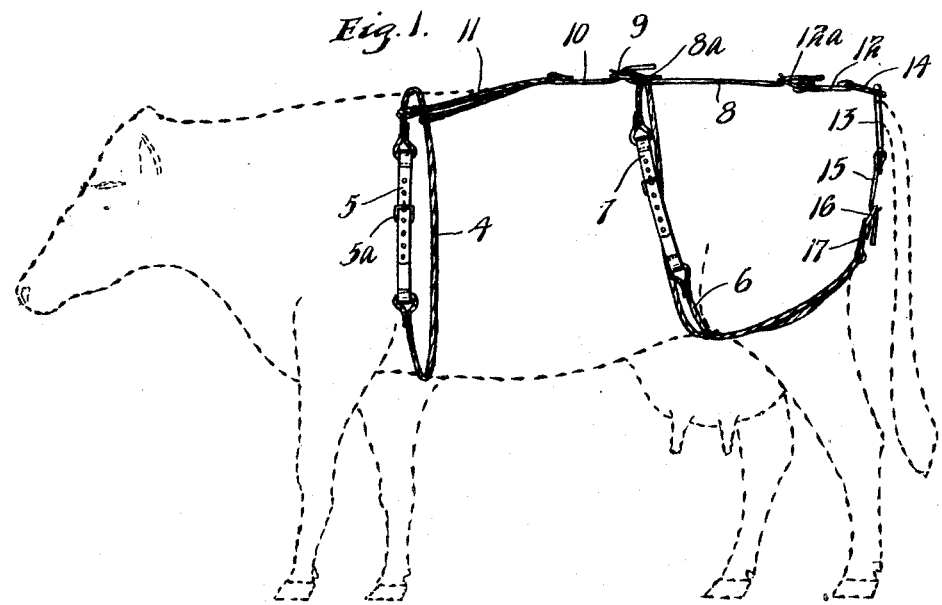
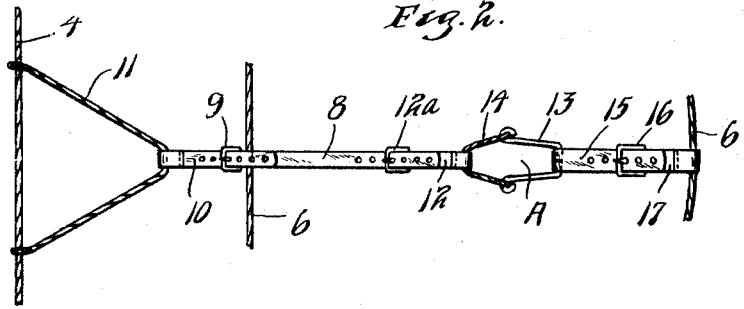
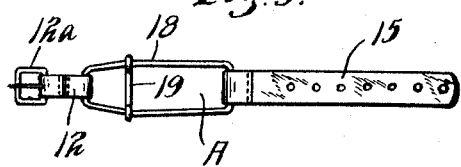
INVENTOR.
ANDREW W. LARSON.
BY HIS ATTORNEYS.

Patented Feb. 23, 1932

1,846,213

UNITED STATES PATENT OFFICE

ANDREW W. LARSON, OF DENHAM, MINNESOTA

ANTIREACTION HARNESS FOR DOMESTIC ANIMALS

Application filed May 21, 1928. Serial No. 279,384.

This invention relates to calfing harnesses for cows and especially for a so-called antireaction harness to be employed after the calf has been born.

It is an object of my invention to provide a simple but highly efficient harness for domestic animals such as cows which will prevent the womb or uterus of the cow from dropping or protruding from the vagina after calfing, which will not bind or interfere with the blood circulation in the body of the cow and which will leave the udder and milk veins free, and moreover permit the cow to pass the afterbirth and to moreover perform its natural functions without interference.

A further object is to provide a harness of the class described, which will be anchored to the fore quarters of the cow and about the hind legs, which will comfortably apply a pressure against the vagina to prevent the uterus from falling, but which will not be painful to the animal and which may be readily applied or removed.

These and other objects and advantages of the invention will be apparent from the following description made in connection with the accompanying drawings, wherein like reference characters refer to similar parts throughout the several views and in which:

Fig. 1 is a perspective view of the calfing harness as applied to the body of a cow;

Fig. 2 is a plan view showing the means for connecting the front band with the rear band of the harness and the pressure applying strap for preventing the womb from becoming displaced or forced out after calfing; and Fig. 3 is a plan view of a slightly modified form of pressure applying strap.

The preferred embodiment of my invention illustrated includes an adjustable forward band 4 which surrounds the body of the animal, just rearwardly of the forequarters and just forwardly of the stomach, said band being preferably provided with a strap portion 5 having the usual adjustable buckle 5a. A rear band designated as an entirety by the numeral 6 surrounds the rear quarters of the animal extending beneath the hind legs and rearwardly around the udder or milk bag. Band 6 is also provided with an adjustable strap and buckle 7 which may be disposed at either side of the animal. The upper portion of band 6 passes through an eye or loop 8a of a back strap 8 extending along the back of the animal above the back bone. Loop 8a carries a buckle 9 which may be connected to a short strap 10 forming a continuation of strap 8 and disposed forwardly thereof, strap 10 being connected at its forward end by a pair of diverging flexible members, such as ropes or cords 11 to the forward band 4, the points of connection with said band being spaced a considerable distance apart and disposed somewhat below the upper portion of the back of the animal. My so-called pressure strap adjustably connects the rearward end of strap 8 with the rear loop of the band 6, holding said rear loop from binding against the udder and the milk veins. This pressure strap includes a short strip 12 provided with a buckle 12a at its forward end to adjustably be engaged with the rear end of strap 8, said strip being connected with a guard member 13 as shown in Figs. 1 and 2, being in the form of a U-shaped metal member or clevis having eyes at its upper end which may be connected with strip 12 by means of a flexible member 14. Guard 13 is adapted to be drawn snugly against the outer extremity of the vagina and the lower end of said guard is connected with a short strap 15 which may be adjustably connected with a buckle 16 carried by a strip 17 which surrounds the rearward end of the band 6.

In Fig. 3 a slightly modified form of pressure strap or cord is illustrated, especially adapted for use where the vagina of the animal is especially tender. In this form an endless flexible member, such as a cord or covered rope 18 is substituted for the U-shaped metal member 13 and the said cord 18 is held in rectangular shape affording a relatively large aperture A by means of a spacer 19, the longitudinal sides of said endless cord passing through suitable eyes in the spacing member and the ends of said cord passing through a loop in strip 12 and a loop in strip 15 respectively. The tail of the animal when the device is applied projects through the aperture A, the aperture also affording space through which the animal may manure or water. The short strap 15 is drawn snugly against the outer extremity of the vagina and exerts a slight pressure thereagainst.

Strap 15 operates in exactly the same manner in either the preferred form of pressure strap illustrated in Figs. 1 and 2, or in the modified form above described.

From the above description it will be seen that with my harness a comfortable strap 15 is applied against the outer end of the vagina preventing the womb of the animal from being pushed outwardly or from falling or becoming distorted while permitting the animal to perform its natural functions without interference. The upper end of the pressure strap is anchored in place by means of its connection with the forward band 4 and the rear band 6, said bands being so constructed that they may be anchored to the body of the animal without interference with the blood circulation and without moreover interfering with the udder and the milk veins of the animal. The harness is adjustable for animals varying considerably in size, since the two bands 4 and 6 may be adjusted by means of their respective buckles and straps 5 and 7 respectively, while the pressure strap itself is adjustable by means of the buckle 17 and strap 15 to supply the desired amount of pressure against the parts about the vagina.

In actual practice the device has demonstrated a high efficiency.

It will, of course, be understood that various changes may be made in the form, details, arrangement and proportions of the parts without departing from the scope of applicant's invention.

What is claimed is:

An anti-reaction harness for domestic animals comprising an anchoring band encircling the forward portion of the trunk of the animal and secured thereto, a rearwardly disposed band extending over the back of the animal and between the legs with its lower looped portion clearing the milk veins, the upper end of said band being connected with said anchoring band, a strap extending longitudinally and rearwardly along the back of the animal and connected at its forward end to said second band and at its rearward and lower end with the lower loop of said second band, said strap including at its medial portion an open member surrounding the anus and vagina of the animal and exerting pressure against the parts adjacent thereto, said open member including a lower substantially rigid U-shaped section for applying pressure to the parts and an upper flexible section constructed of rope or the like.

In testimony whereof I affix my signature.

ANDREW W. LARSON.